US011170171B2

United States Patent
Ritter et al.

(10) Patent No.: US 11,170,171 B2
(45) Date of Patent: Nov. 9, 2021

(54) MEDIA DATA CLASSIFICATION, USER INTERACTION AND PROCESSORS FOR APPLICATION INTEGRATION

(71) Applicant: SAP SE, Walldorf (DE)

(72) Inventors: Daniel Ritter, Heidelberg (DE); Yannik Bart, Freinsheim (DE); David Thol, Hofheim am Taunus (DE)

(73) Assignee: SAP SE, Walldorf (DE)

( * ) Notice: Subject to any disclaimer, the term of this patent is extended or adjusted under 35 U.S.C. 154(b) by 92 days.

(21) Appl. No.: 16/133,460

(22) Filed: Sep. 17, 2018

(65) Prior Publication Data

US 2020/0089764 A1    Mar. 19, 2020

(51) Int. Cl.
*G06F 16/33* (2019.01)
*G06F 40/30* (2020.01)
*G06F 9/445* (2018.01)
*G06F 16/43* (2019.01)
*G06F 16/44* (2019.01)
*G06K 9/00* (2006.01)

(52) U.S. Cl.
CPC .......... *G06F 40/30* (2020.01); *G06F 9/44505* (2013.01); *G06F 16/43* (2019.01); *G06F 16/44* (2019.01); *G06K 9/00288* (2013.01)

(58) Field of Classification Search
CPC ...... G06F 40/30; G06F 9/44505; G06F 16/44; G06F 16/43
See application file for complete search history.

(56) References Cited

U.S. PATENT DOCUMENTS

| 7,237,225 B2* | 6/2007 | Kompalli | G06F 8/20 717/108 |
| 7,508,961 B2* | 3/2009 | Chen | G06K 9/00234 382/118 |
| 8,369,608 B2* | 2/2013 | Gunaratne | G06K 9/00214 382/118 |
| 8,381,180 B2* | 2/2013 | Rostoker | G06Q 30/02 717/101 |

(Continued)

OTHER PUBLICATIONS

Ritter et al., "Toward Application Integration with Multimedia Data," 2017 IEEE 21st International Enterprise Distributed Object Computing Conference (EDOC), Quebec City, QC, 2017, pp. 103-112.*

(Continued)

*Primary Examiner* — Maikhanh Nguyen
(74) *Attorney, Agent, or Firm* — Mintz Levin Cohn Ferris Glovsky and Popeo, P.C.

(57) ABSTRACT

Systems and methods to modify images, extract features, convert image to text and vice versa, etc., includes deriving multimedia operations from requirements (e.g., resize, crop as modification, mark artifacts in image, face detection for query), and extending current integration foundations (i.e., integration patterns) by new patterns and uses for multimedia along the identified requirements for read, write, update, query operations. Conditions and expressions are defined for pattern configuration and execution as semantic, application-level constructs (e.g., detect face on image, extract address or account data). Patterns to a language are composed with embedded multimedia operations and configuration constructs.

12 Claims, 7 Drawing Sheets

(56) References Cited

U.S. PATENT DOCUMENTS

| | | | | |
|---|---|---|---|---|
| 8,413,150 | B2* | 4/2013 | Lu | G06Q 10/0633 718/100 |
| 8,762,187 | B2* | 6/2014 | Gu | G06Q 10/0633 705/7.11 |
| 9,406,040 | B2* | 8/2016 | Ritter | G06Q 10/06316 |
| 9,483,329 | B2* | 11/2016 | Ritter | G06F 8/10 |
| 9,778,966 | B2* | 10/2017 | Ritter | G06Q 10/06316 |
| 10,419,586 | B2* | 9/2019 | Ritter | G06Q 10/00 |
| 10,564,937 | B2* | 2/2020 | Ritter | G06F 9/541 |
| 2004/0044986 | A1* | 3/2004 | Kompalli | G06Q 30/02 717/100 |
| 2004/0179719 | A1* | 9/2004 | Chen | G06K 9/00234 382/118 |
| 2005/0105803 | A1* | 5/2005 | Ray | G06F 16/5838 382/209 |
| 2008/0127052 | A1* | 5/2008 | Rostoker | G06F 8/34 717/105 |
| 2010/0322507 | A1* | 12/2010 | Gunaratne | G06K 9/00214 382/154 |
| 2011/0029983 | A1* | 2/2011 | Lu | G06Q 10/0633 718/105 |
| 2014/0372488 | A1* | 12/2014 | Ritter | G06F 16/22 707/812 |
| 2016/0285698 | A1* | 9/2016 | Ritter | G06Q 10/00 |
| 2016/0292024 | A1* | 10/2016 | Ritter | G06Q 10/10 |

OTHER PUBLICATIONS

Ranjan et al., "Deep Learning for Understanding Faces: Machines May Be Just as Good, or Better, than Humans," in IEEE Signal Processing Magazine, vol. 35, No. 1, pp. 66-83, Jan. 2018.*

D. Hentschel. *Multimedia Integration Processing (Arbeitstitel)*. Studiengang Wirtschaftsinformatik, Studienrichtung Software Engineering, Duale Hochschule Baden-Württemberg Mannheim, Bachelorarbeit. Bearbeitungszeitraum: Feb. 15, 2016 bis May 8, 2016, 29 pages.

Y. Bart. *Betrachtung von Integrationsmustern anhand bestimmter Integrationsszenarien im Kontext der Optischen Zeichenerkennung*. Studiengang Wirtschaftsinformatik, Studienrichtung Software Engineering, Duale Hochschule Baden-Württemberg Mannheim, Bachelorarbeit. Bearbeitungszeitraum: Feb. 15, 2016 bis May 8, 2016, 99 pages.

D. Ritter and S. Rinderle-Ma. *Multimedia Integration Pattern Representations*. 3 pages.

\* cited by examiner

| Pattern Name | Multimedia Operation | Arguments | Physical | Logical |
|---|---|---|---|---|
| explicit | | | | |
| Channel Adapter | format conversion | format indicator | write | create |
| Splitter | fixed grid, object-based select object | grid: horizontal, vertical cuts; object | create | recal/write |
| Router, Filter | | | | read |
| Aggregator | fixed grid, object-based coloring | grid: rows, columns, heights, width color (scheme) | create | recal/write |
| Translator, Content Filter Content | add shape, OCR text | object, shape+color, text | write | recal/write |
| Enricher Feature Detector | segmentation, matching | object classifier | write read | recal/write create |
| Image Resizer | scale image | size: height, width | write | write |
| extra | | | | |
| Idempotent Receiver | detector, similarity detector | object for comparison | - | read |
| Message Validator | | validation criteria | - | read |

FIG. 3

MEDIA DATA CLASSIFICATION, USER INTERACTION AND PROCESSORS FOR APPLICATION INTEGRATION

TECHNICAL FIELD

The subject matter described herein relates to media data classification, and particularly enterprise application integration of the same for improved user interaction.

BACKGROUND

Traditionally, enterprise application integration (EAI) processes structured data. Recent trends such as social and multimedia computing have led to an increase in unstructured multimedia data, such as images and video streams, which have to be processed by EAI. This poses challenges to EAI with respect to variety, velocity, and volume of the processed data. Furthermore, multimedia data has more semantic qualities (e.g., emotions, etc.) compared to structured data, making the data processing and user interaction more difficult.

There are a large number of computer applications, and in particular business applications, directed to social media, multimedia, personal and affective computing, where socio-technical interactions and communications are introduced into applications. Thus, in various applications, such as agricultural and medical applications, EAI must now process unstructured multimedia data and provide social sentiment analysis. FIG. 1 illustrates one such exemplary application, in which multimedia must be effectively integrated in a social media application in which users that are remote from each other share images in a food ordering process.

The sequence of operations of many multimedia applications actually denote integration processes, thus leading to new EAI characteristics with respect to the representation and variety of the ex-changed messages (i.e., multimodal: textual and multimedia), the growing number of communication partners (i.e., message endpoints), as well as the velocity (i.e., message processing styles), and volume (i.e., message sizes) of the data.

Cloud and mobile applications are diverse and challenge integration systems in terms of variety with respect to non-textual message formats. Non-textual or binary formats (e.g., scanned text documents or images or video) cannot be evaluated currently, and thus their data cannot be considered during message processing. Currently, only meta-data of binary messages can be evaluated using only meta-data-related, textual actions. The EAI foundations do not cover these aspects, and the current EAI foundations in form of the enterprise integration patterns (EIPs) and system architectures do not address the multimedia characteristics, and lead to a number of challenges that are not met by current system implementations, which include:

User interaction and interoperability (interaction with endpoints): (a) the representation of multimodal messages (i.e., relational and multimedia), for instance, in form of message format extensions like attachments, and growing variety of protocols with combined textual and media messages (e.g., seamless integration relational and media processing); (b) The message processing and user interaction changes from relational to multimodal (e.g., conditions, expressions), which (c) requires to deal with semantics in multimedia data, while over-coming the "semantic gap" as in the current MPEG-7 standard. Previous initiatives have only been able to target low-level media features that are inadequate for representing the actual semantics for business applications like emotions.

Architectural challenges: addressing the system de-sign that faces the interaction with a growing number of dynamic endpoints and the co-existence of processing styles: asynchronous and synchronous streaming, including additionally required components compared to the current EAI systems.

Multimodal processing: combining processing styles (streaming, multimodal), distributed processing units (device, EAI system), process optimizations, and data compression to deal with the increasing message sizes for multimodal content.

For instance, current implementations of social media sentiment analysis scenarios are either focused on textual information, or process multimedia data only in an ad-hoc way. As shown in FIG. 2, they usually collect and filter social feeds from sources like Twitter® and Facebook® according to configurable keyword lists that are organized as topics. The textual information within the resulting feeds is analyzed with respect to sentiments toward the specified topic.

However, many sentiments are expressed by images in the form of facial expressions. Therefore, the received feeds would require a multimedia message filter, e.g., removing all images not showing a human, an Enricher for marking the feature, a Splitter for splitting images with multiple faces to one-face messages, and an Enricher, which determines the emotional state of the human and adds the information to the image or textual message, while preserving the image. The interaction with the multimodal messages by formulating user conditions and the required multimedia processing are currently done by a large variety of custom functions, thus denote ad-hoc solutions.

Therefore, existing EAI systems are extended by arbitrary multimedia processing components in custom projects that destabilize these systems and make the validation of the multimodal EAI processes difficult. These challenges are set into context of the current EIP processing.

SUMMARY

This document presents systems and methods for user interaction, including semantic message representation and custom conditions and expressions. The systems and methods include new architecture components for learning and detecting semantics in multimodal messages and multimodal message processing.

The systems and methods described herein provide multimedia application integration and a solution toward a more standard user interaction and configuration of multimedia scenarios. Industrial and mobile scenarios requiring multimedia integration are identified, which result in a list of patterns relevant for multimedia processing. For the underlying integration semantics of these patterns, multimedia pattern realizations are defined, to which the operations from the analysis are mapped. Consequently, a compact, logical, and multimedia representation toward a uniform user interaction that takes the image semantics into account is presented.

In one aspect, a method, and a system and computer program product that executes the method, includes classification of multimedia requirements in applications. The method includes steps to modify images, extract features, convert image to text and vice versa, etc. The method further includes deriving multimedia operations from requirements (e.g., resize, crop as modification, mark artifacts in image, face detection for query), and extending current integration foundations (i.e., integration patterns) by new patterns and uses for multimedia along the identified requirements for read, write, update, query operations. The method further includes defining conditions and expressions for pattern configuration and execution as semantic, application-level constructs (e.g., detect face on image, extract address or account data). The method further includes composing patterns to a language with embedded multimedia operations and configuration constructs.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims, which are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 lists the relevant patterns and sets them into context to their multimedia operations;

When practical, similar reference numbers denote similar structures, features, or elements.

DETAILED DESCRIPTION

Figure 1:
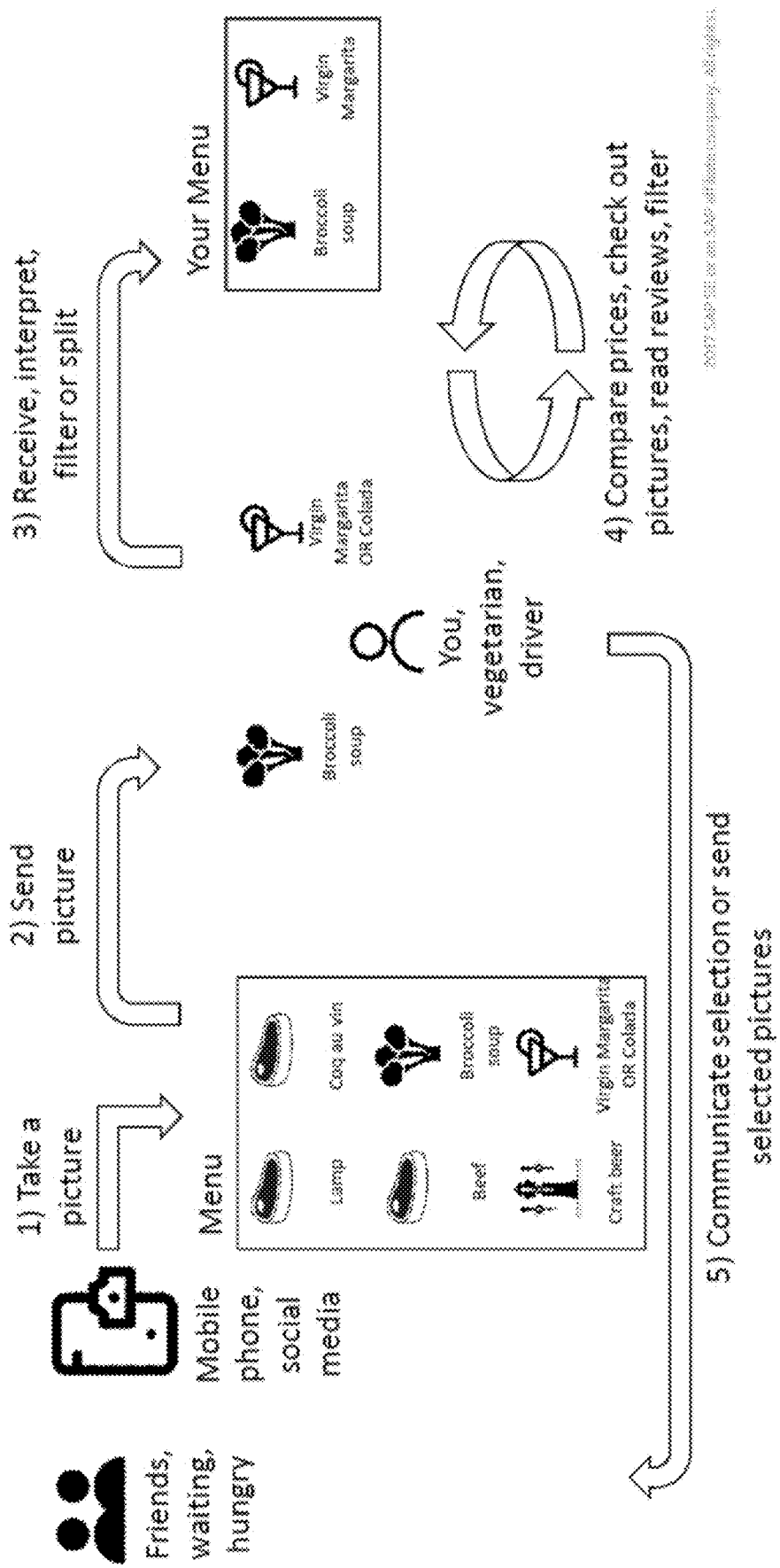
FIG. 1 illustrates an exemplary application, in which multimedia must be effectively integrated in a social media application, in which remote users share images in a food ordering process.
Figure 2:
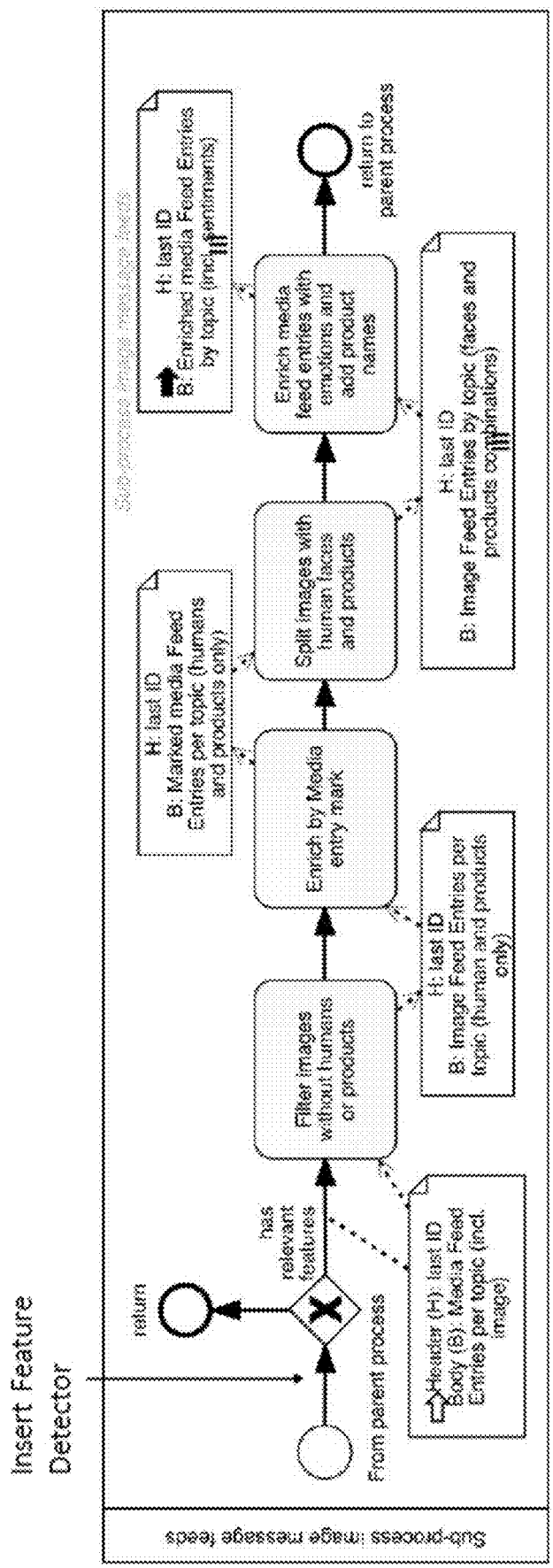
FIG. 2 illustrates a social media sentiment analysis scenario, in which users collect and filter social feeds on a computing system from social media sources according to configurable keyword lists that are organized as topics.

This document presents a system and method for user interaction, including semantic message representation and custom conditions and expressions. The system and method include new architecture components for learning and detecting semantics in multimodal messages, and the multimodal message processing.

As used herein, the term "multimedia" is defined as image, video and text-as-image data (not only meta-data). In some implementations of the subject matter described herein, a method includes classification of multimedia requirements in applications includes, without limitation, modify images, extract features, convert image to text and vice versa, etc. The method further includes deriving multimedia operations from requirements (e.g., resize, crop as modification, mark artifacts in image, face detection for query), and extending current integration foundations (i.e., integration patterns) by new patterns and uses for multimedia along the identified requirements for read, write, update, query operations. The method further includes defining conditions and expressions for pattern configuration and execution as semantic, application-level constructs (e.g., detect face on image, extract address or account data). Finally, the method includes composing patterns to a language with embedded multimedia operations and configuration constructs.

Thus, in accordance with implementations described herein, systems and methods allows users of multi-media business applications to sketch expressions as images, i.e., visually. The language expresses semantic media concepts and allows a translation to the integration runtime system, such as, for example, video streaming integration operations (e.g., windowing, aggregation over several frames). In some implementations, a system and method combine optical character recognition (OCR) and image or video operators, for visualization and modeling of the integration language constructs, for example.

The integration runtime system is extended by media components to process media integration scenarios. This allows hardware-accelerated image and condition processing e.g., using a graphics processing unit (GPU). The system includes optimizations for expensive media processing like load distribution and partitioning, compression, and compressed operations (due to background not permanently changing in videos).

Several industrial domains and mobile applications that require multimedia EAI have been identified, the required integration aspects are developed by mapping them to the existing EIP that are affected by multimedia processing as well as identified several new patterns (i.e., Feature Detector, Image Resizer, Validator, Message Decay, Signer and Verifier). In contrast, patterns like Wire Tap or Recipient List are not required by the identified applications, thus do not show any significant relation to media processing. These patterns are classified herein according to the dimensions "complexity" and "modality," separating simpler from more complex operations as well as single modal (i.e., textual, multimedia) from multimodal processing (i.e., combined textual and multimedia).

Some categories are currently not covered—apart from "Capture, Share" (Adapter Channel) and "Text-to-Text." While many multimedia processing approaches focus on the metadata, and thus are "Text-to-Text," "Media-to-Media" denotes an exclusive processing of the multimedia data. Similarly, all complex, but single modal cases are either exclusively textual or multimedia processing (e.g., enrich image by adding geometrical shapes). For some of the complex cases, additional resources are required such as a data store for the aggregator, or a key store for the Signer pattern. The simple multimodal processing denotes transformations between textual and multimedia (e.g., text to image or image semantics to text). The more complex, multimodal processing includes multimodal operations such as the "Media-to-Media,Text" case. This document focuses mainly on "Media-to-Media," and the routing and transformation patterns from the analysis (e.g., filter, split, aggregate, enrich) required for the identified multimedia integration scenarios.

The multimedia operations are mapped to the relevant integration patterns, and a logical representation toward a uniform user interaction (i.e., pattern configuration including conditions and expressions) and a physical representation for the evaluation during runtime execution are described, thus separating the runtime from the user interaction.

FIG. 3 lists the relevant patterns and sets them into context to their multimedia operations. In addition, to the pattern and the corresponding multimedia operation, the (semantic) configuration arguments relevant for the user interaction are added, while assuming that all operations are executed on multimedia messages that are part of the physical representation. For instance, almost all of the image collage mobile applications require grid-based image fusion for rows and columns, or specify height and width parameters. The splitter, required in the social applications, but also partially in medical and farming applications, either requires simple (fixed) grid-based horizontal or vertical cutting or a more complex object based splitting. Accordingly, the physical and logical representations are introduced, in which contexts the relevant multimedia EAI concepts and patterns are defined.

The basic EAI concepts located in the physical or runtime representation can include the multimedia Document Message, Message Channel, Channel Adapter, Message Endpoint, and Format Converter. In addition, all identified routing and transformation patterns have a physical representation, with which they interact. These patterns are grouped by their logical and physical data access as read/ write and read-only, as shown in FIG. 3.

For multimedia processing, the physical message representation covers the multimedia format, on which the multimedia operators are applied. Hence it is specific to the underlying multimedia runtime system or library. The current message definition of textual content (i.e., body) and their metadata (i.e., headers) is therefore extended by binary body entries and attachments. That allows to represent and query structured information in the message body together with unstructured information as attachments at the same time.

As shown in FIG. 3, there are patterns that create, read and change/write to these messages. For instance, a Channel Adapter receives the multimodal messages from a Message Endpoint (e.g., Twitter®, Flickr®) and transforms (write; similar to the Type Converter) the textual and multimedia formats into a physical runtime representation (e.g., JPEG to TIFF for OCR processing) as part of a Canonical Data Model, and creates (create) the logical representation that is based on the semantic features of the multimedia message content, for the user interaction. However, not all current integration adapters are able to handle binary content in the message body and/or attachments (e.g., SMTP separates both, while HTTP only sends one multi-part body).

Read/write Patterns: the Splitter splits the multimedia message either by a fixed grid (e.g., cut in half) or based on its domain objects (e.g., human) into smaller ones. Thereby new physical message are created, while the logical representation has to be updated, if it cannot be recalculated (e.g., by exploiting the information on how the image was cut). The aggregator pattern denotes the fusion of several multimedia messages into one. Therefore, several images are combined using a correlation condition based on a multimedia object (e.g., happy customers), and aggregated, when a time-based or numerical completion condition is met (e.g., after one minute or four correlated multimedia messages). The aggregation function denotes a fixed grid operation that combines the multimedia objects along the grid (e.g., 2×2 image frames from a video stream).

The logical and physical operations are the same as for the splitter. Similarly, the Translator and Content Filter change the properties of a multimedia object (e.g., coloring). Since this operation is less relevant for business application, it denotes a rather theoretical case, which might only slightly change the logical, however, changes the physical representation. In contrast, the Content Enricher adds geometrical features like shapes to images, e.g., relevant for marking or anonymization, or places OCR text, e.g., for explanation, highlighting. Thereby, the physical and logical representations are changed or recalculated. The Image Resizer scales the physical image and their logical representation, which cannot be recalculated in most cases. The resizer is used to scale down images similar to message compression.

Read-only Patterns: The content-based router and message filter patterns base their routing decision on a selected feature or object (e.g., product, OCR text) through reading the logical representation, while the physical multimedia data remains unchanged. Therefore, the features or objects within the multimedia data have to be detected. In the analysis, a separate Feature Detector was required, which reads the physical representation and returns a corresponding logical feature representation. Based on this logical representation, the Idempotent receiver and Message Validator patterns work in a read-only mode.

Figure 4:
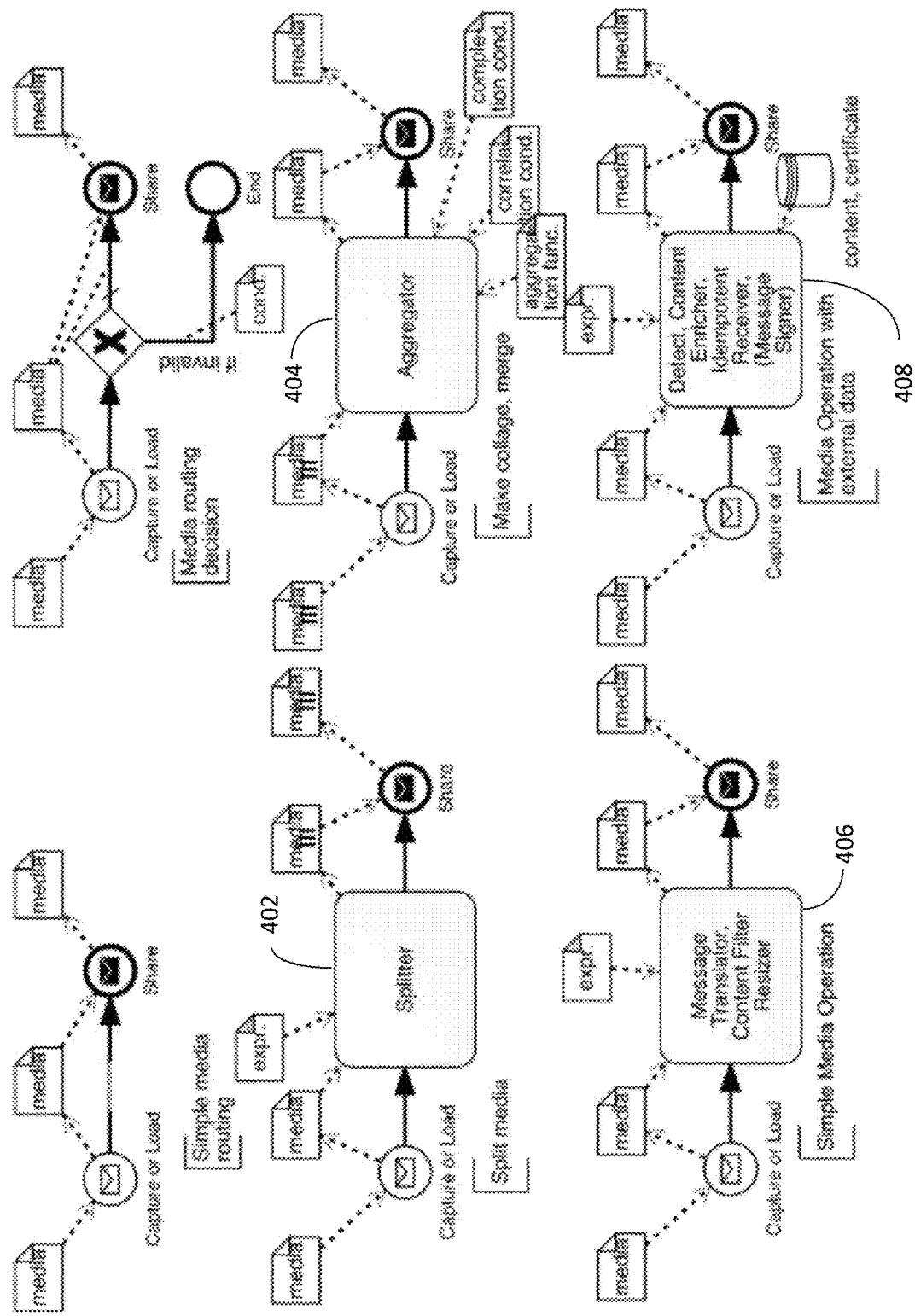
FIG. 4 illustrates modeling stereotypes for multimedia application integration modeling, using several of the components shown in FIG. 3.

FIG. 4 illustrates modeling stereotypes for multimedia application integration modeling, using several of the components shown in FIG. 3. FIG. 4 depicts an overview of integration patterns 400 that could be implemented by using various open-source and proprietary vendor systems, and which can include a splitter 402, an aggregator 404, a message translator/content filter resizer 406, and/or a detector/content enricher 408.

Logical Representation

The logical representation targets the user interaction, and thus defines a Canonical Data Model based on the domain model/message schema of the messages and the access patterns.

Canonical Data Model for User Interaction: While there are standards for the representation of structured domain models (e.g., XSD, WSDL), in which business domain objects are encoded (e.g., business partner, customer, employee), multimedia models require a semantic representation with a confidence measure that denotes the probability of a detected feature. A graph structured schema of the domain object is assumed (e.g., human expressing emotion), with properties on nodes and edges.

Figure 5:
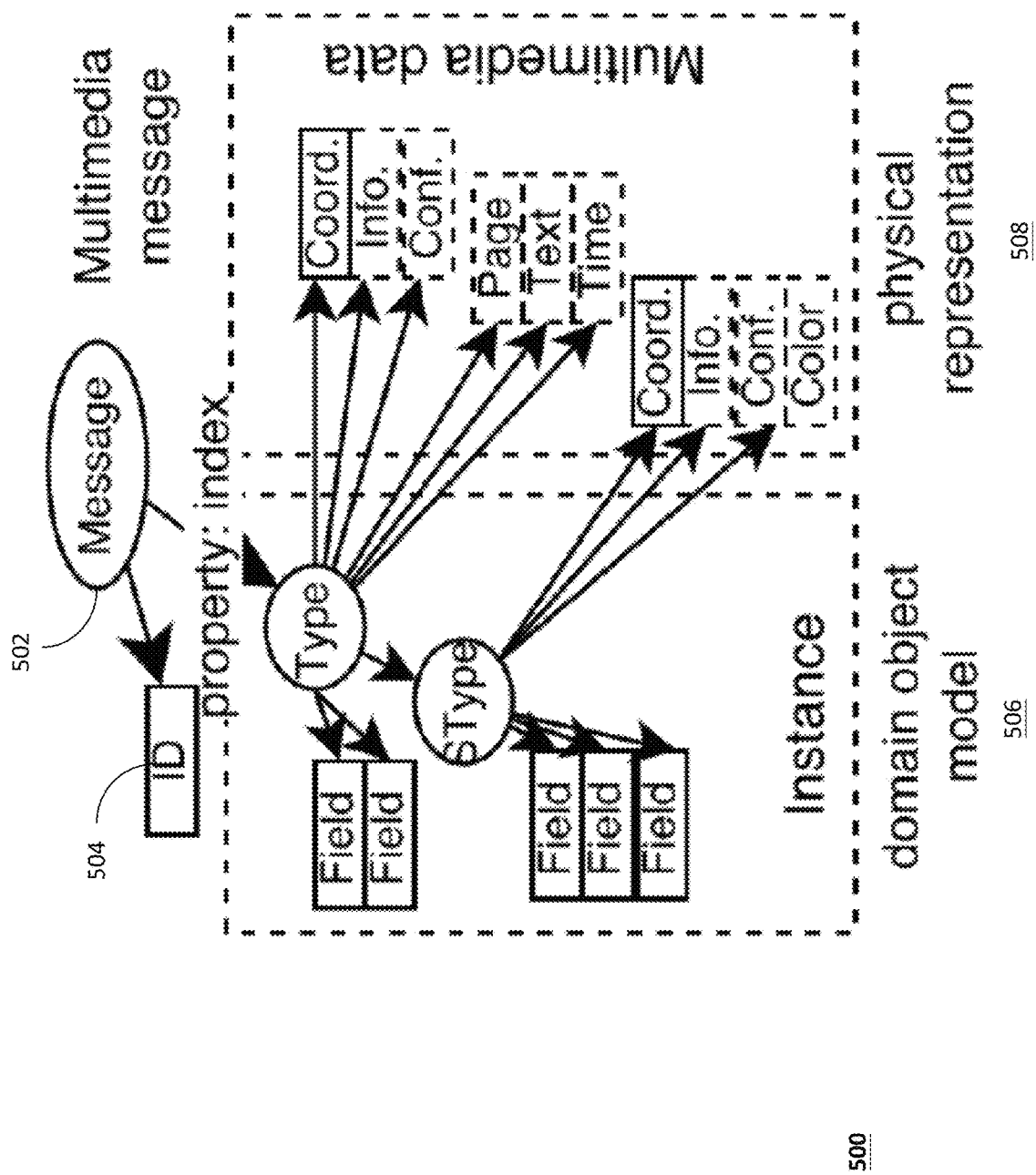
FIG. 5 depicts the conceptual representation of a property graph starting from the message root node.

FIG. 5 depicts the conceptual representation of a property graph 500 starting from the message root node 502 (and its properties, e.g., the message identifier 504). For the domain object model 506 sub-graph (i.e., type Type with subtypes SType), another property is added to the (semantic) Document Message, which is a transient and removed from the message, before sent to a receiving Message Endpoint. To express the confidence on the detected domain object, all type and sub-type nodes get a Conf. field (e.g., type=human with conf=0.85, stype=emotion, value=happy with conf.=0.95). With this compact definition, lists of arbitrary domain objects can be represented as a physical representation 508. Through the schema information, these graphs can be formally evaluated. An instance of this model is created during message processing by the Feature Detector pattern.

From Multimedia Features to Domain Objects/Message Schema: The term "Semantic Gap" denotes the difference between low-level image features, usually represented by n-dimensional, numerical vector representing an object, called feature vector, and the actual domain object that has a meaning to the user. According to the scenario analysis, the following image features are considered relevant: color, position, time (interval) in a video stream, during which the domain object was visible or the page number in an OCR document. A domain object is created from the underlying features as given by the existing content-based media retrieval mechanisms, which is during the message processing in the physical runtime representation. However, for a mapping between the runtime and logical representation, the identified image features are added to the multimedia message index.

Access Patterns: The defined canonical data model is at the center of the user interaction. However, the user should mainly require knowledge about the actual domain model, and thus formulate all integration conditions and expressions accordingly. The following common access patterns are used:

Feature Selector: The Content-based Router, Message Filter, Idempotent Receiver and Message Validator patterns as well as the correlation and completion conditions of the aggregator (not shown), the object split condition of the splitter, and the content enricher "mark object" operation are similar in the way they access the data and which multimedia artefacts they require. They require a Feature Detector to detect the domain object (by schema) and create the logical representation. Based on this information the object is selected and the corresponding operation is executed. For instance, the runtime system detects a human and his/her facial expression within an image, using the detector and creates the corresponding message model. Now, the user can configure the splitter to select humans and add conditions for facial expressions, to select them using the selector. Once selected, the splitter cuts the image according to the image coordinates of the selected feature and returns a list of sub-types in the number of humans and the corresponding cut images. The underlying integration runtime system takes the list of sub-types and images and creates new messages for each sub-type/image pair.

Detector Region: The creation of the defined message model through feature detection is computationally expensive, since it involves image processing. Each pattern in an integration process requires such a detect operation, if there is no detector prior to the pattern. Consequently, the detector can be built-in into each pattern or added as separate operation, before a sequence of several read-only patterns or patterns, for which the message graph can be re-calculated (e.g., aggregator, splitter, etc.). For instance, for fixed grid (with predefined cuts) and object splitters, the cut regions are known, and thus the properties of the model type can be computed (e.g., coordinates, color) and does not need to be detected. And the Content Enricher mark operation appends the shape, color, coordinates and a new mark node in the graph, thus no detection is required. This way, all subsequent patterns after a detector share the same message property index and do not require further image operations. Such a pattern sequence is called a Detector Region.

Parameterized Access: Additional information is required for some of the patterns that change the physical representation like the Image Resizer, which requires scale parameters, or the shape and color information for the enricher and the translator. Therefore, these patterns modify the feature vector directly (e.g., by changing the color or size). These changes are detected and executed on the physical multimedia object.

EAI System Architecture Extensions

Figure 6:
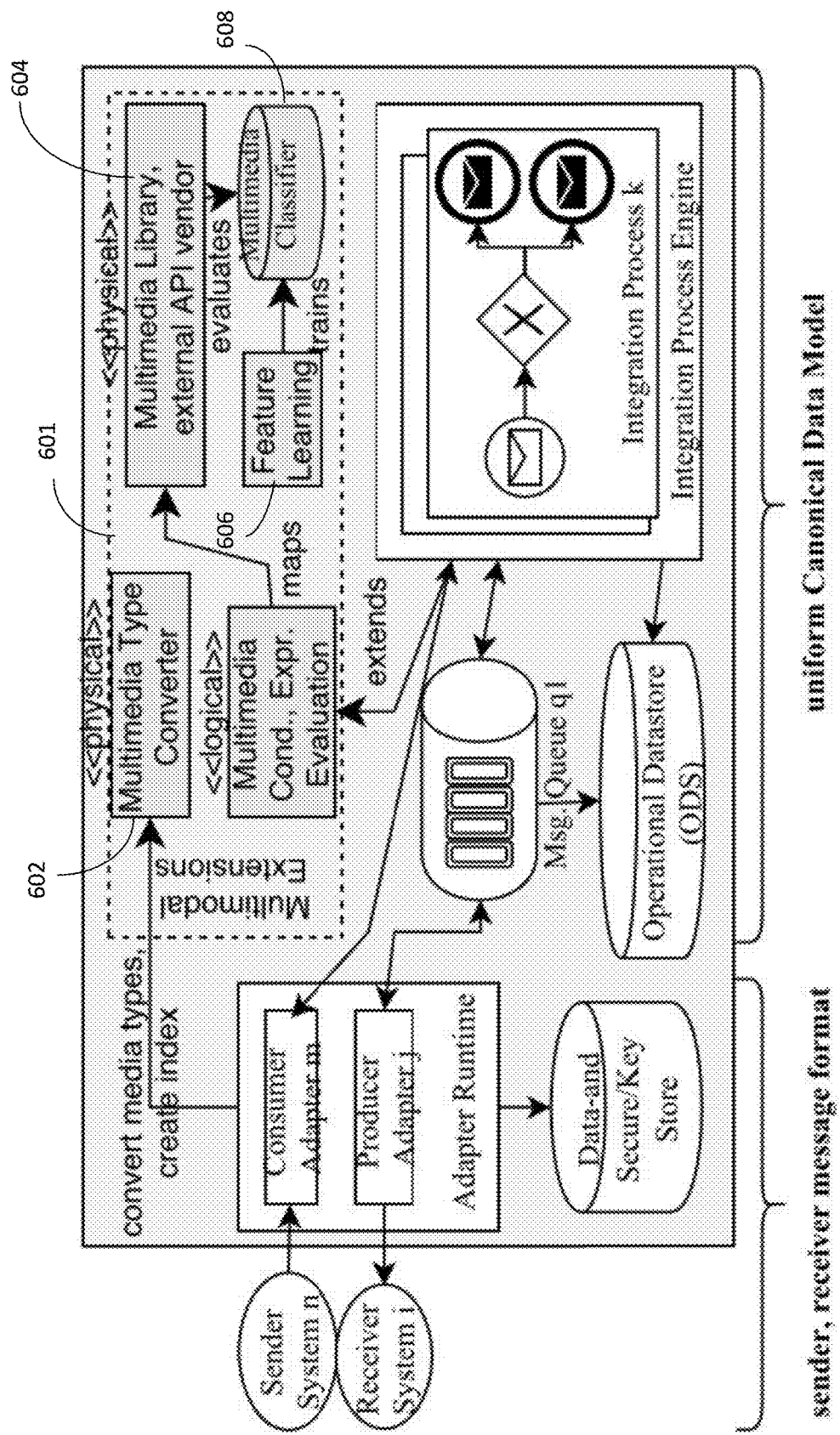
FIG. 6 illustrates an EAI system architecture, in accordance with some implementations of the subject matter described herein.

FIG. 6 illustrates a system 600 for pattern realization, and which includes multimodal extensions 601. The physical system aspects include multimedia type converters 602 and multimedia libraries 604. These libraries can include feature learning components 606 that learn multimedia classifiers 608 for the semantic objects in multimedia data. The libraries evaluate the data according to the classifiers. For the mapping between ontologies and classifiers, the Multimedia Cond., Expr. Evaluation contains the stored domain object models (e.g., ontologies) as well as the repository for user conditions and expressions (e.g., RDF statements).

Pattern Realization

The logical representation requires a semantic graph, such as the W3C Resource Definition Framework (RDF) semantic web standard, similar to metadata representation of images in Photo-RDF. For the schema representations, ontologies are chosen for human emotions or real-world business products. For each ontology, a classifier is required to the physical runtime system. The selectors on the semantic RDF graph model are realized by SPARQL queries. The user interacts with the system by selecting a schema in form of an ontology and adds the SPARQL query according to the access patterns. If the system has built-in ontology/classifier combinations, only the query is added, and thereby only the domain ontology has to be understood. For parametrized access, extensions from the physical representation have to be learned by the user.

In some exemplary implementations, for the pattern realization in the EAI system, JavaCV (i.e., based on the widely used OpenCV2 library) can be used in addition to Apache Camel as an open source multimedia processing system, including their type converters. For feature detection (e.g., for facial recognition) with JavaCV, Haar classifiers can be used, which have to be trained with positive examples of a features (e.g., faces) as well as negative examples (i.e., arbitrary images without the feature). It is a cascading classifier, consisting of several simpler classifiers that are subsequently applied to an image or region and retrieve the coordinates as well as the object type that can be retrieved. All entering multimedia messages are processed by applying the classifiers.

The model described herein is compact, but comprehensively usable with different image processing systems. Through the separation of the physical runtime and logical representation for user interaction, the comprehensiveness can be checked by its pattern coverage and finding mappings to different image processing systems, while keeping the integration conditions and expressions stable. Any number of multimedia processing systems/APIs from established artificial intelligence vendors can be used.

Figure 7:
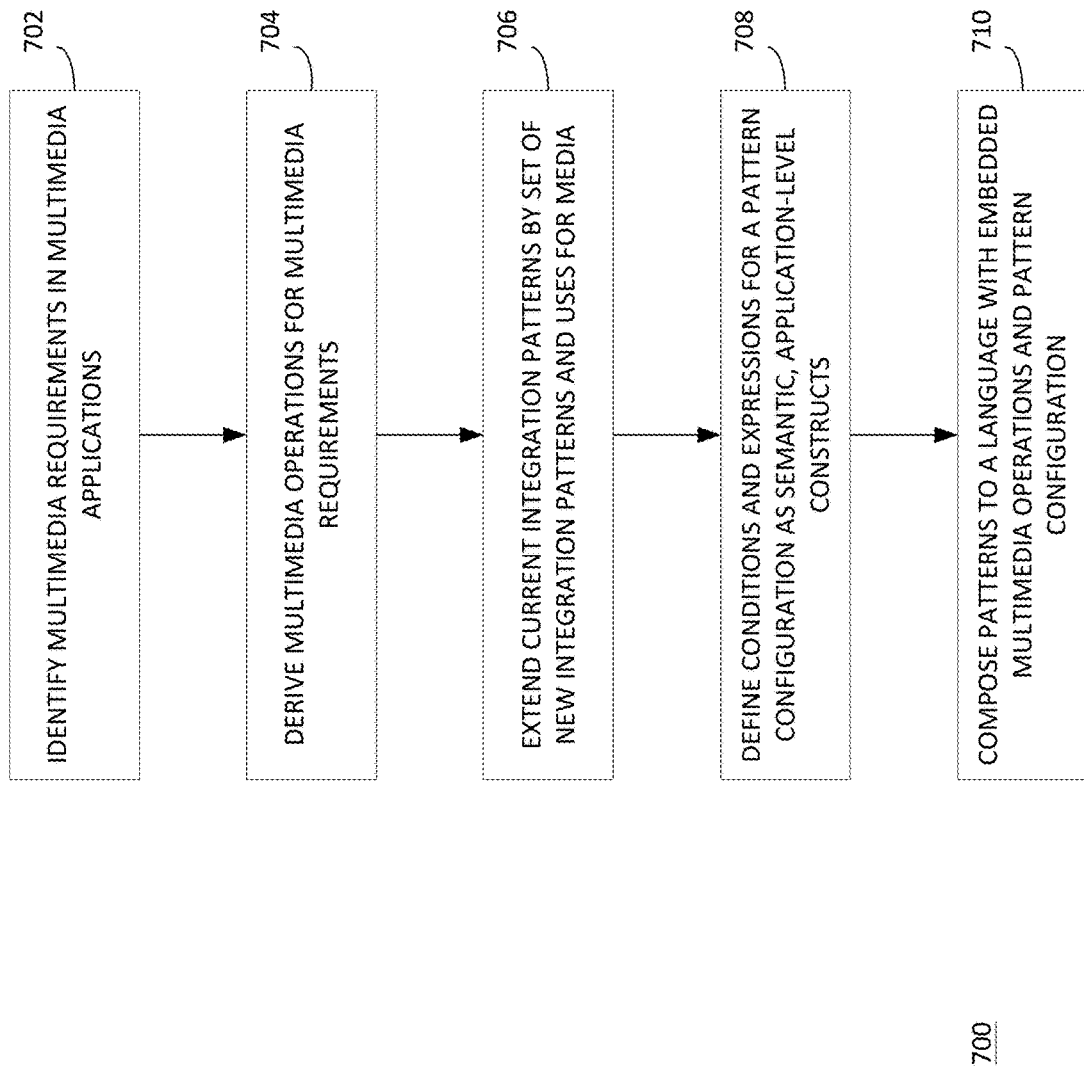
FIG. 7 is a flowchart of a media data classification method in accordance with implementations described herein.

FIG. 7 is a flowchart of a media data classification method 700 for integrating and visualizing media from a number of multimedia applications, in accordance with implementations described herein, and as executed by one or more data processors. At 702, multimedia requirements in each of the multimedia applications are identified. At 704, multimedia operations from the multimedia requirements are derived. The multimedia operations include a set of current integration patterns. At 706, the set of current integration patterns are extended by a set of new patterns and uses for the media based on the identified requirements. At 708, conditions and expressions for a pattern configuration are defined that can be executed by the one or more data processors as semantic, application-level constructs. At 710, one or more patterns to a language with embedded multimedia operations and the pattern configuration are composed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for integrating and visualizing media from a plurality of multimedia applications, the method comprising:

classifying, by one or more data processors, multimedia requirements in each of the plurality of multimedia applications, the classifying including identification of whether each of the plurality of multimedia application performs one or more processing functions including modifying images, extracting features, and/or converting images to text;

deriving, by the one or more data processors, multimedia operations from the multimedia requirements, the derived multimedia operations including a face detection query operation and a set of current integration patterns, wherein multimedia operations derived from the multimedia requirements include one or more of operations to resize, crop as modification, and mark artifacts in image;

extending, by the one or more data processors, the set of current integration patterns of an enterprise application integration system by a set of new patterns based on the classified requirements and derived multimedia operations;

defining, by the one or more data processors, conditions and expressions for a pattern configuration that can be executed by the one or more data processors as semantic, application-level constructs, wherein at least one of the constructs detects a face on an image; and composing, by the one or more data processors, one or more patterns to a language with embedded multimedia operations and the pattern configuration, the language providing visualization and modeling for the enterprise application integration system.

2. The computer-implemented method in accordance with claim 1, wherein the multimedia requirements are classified according to a processing function to be applied to the media.

3. The computer-implemented method in accordance with claim 1, wherein the semantic, application-level constructs include one or more constructs to extract an address and extract account data.

4. The computer-implemented method in accordance with claim 1, wherein the classified requirements include operations to read, write, update, and query the media.

5. A computer program product comprising a non-transitory machine-readable medium storing instructions that, when executed by at least one programmable processor, cause the at least one programmable processor to perform operations comprising:

classifying, by one or more data processors, multimedia requirements in each of the plurality of multimedia applications, the classifying including identification of whether each of the plurality of multimedia application performs one or more processing functions including modifying images, extracting features, and/or converting images to text;

deriving, by the one or more data processors, multimedia operations from the multimedia requirements, the derived multimedia operations including a face detection query operation and a set of current integration patterns, wherein multimedia operations derived from the multimedia requirements include one or more of operations to resize, crop as modification, and mark artifacts in image;

extending, by the one or more data processors, the set of current integration patterns of an enterprise application integration system by a set of new patterns based on the classified requirements and derived multimedia operations;

defining, by the one or more data processors, conditions and expressions for a pattern configuration that can be executed by the one or more data processors as semantic, application-level constructs, wherein at least one of the constructs detects a face on an image; and composing, by the one or more data processors, one or more patterns to a language with embedded multimedia operations and the pattern configuration, the language providing visualization and modeling for the enterprise application integration system.

6. The computer program product in accordance with claim 5, wherein the multimedia requirements are classified according to a processing function to be applied to the media.

7. The computer program product in accordance with claim 5, wherein the semantic, application-level constructs include one or more constructs to extract an address and extract account data.

8. The computer program product in accordance with claim 5, wherein the classified requirements include operations to read, write, update, and query the media.

9. A system for integrating and visualizing media from a plurality of multimedia applications, the system comprising:

a programmable processor; and a non-transitory machine-readable medium storing instructions that, when executed by the processor, cause the at least one programmable processor to perform at least some of the operations:

classifying, by one or more data processors, multimedia requirements in each of the plurality of multimedia applications, the classifying including identification of whether each of the plurality of multimedia application performs one or more processing functions including modifying images, extracting features, and/or converting images to text;

deriving, by the one or more data processors, multimedia operations from the multimedia requirements, the derived multimedia operations including a face detection query operation and a set of current integration patterns, wherein multimedia operations derived from the multimedia requirements include one or more of operations to resize, crop as modification, and mark artifacts in image;

extending, by the one or more data processors, the set of current integration patterns of an enterprise application integration system by a set of new patterns based on the classified requirements and derived multimedia operations;

defining, by the one or more data processors, conditions and expressions for a pattern configuration that can be executed by the one or more data processors as semantic, application-level constructs, wherein at least one of the constructs detects a face on an image; and composing, by the one or more data processors, one or more patterns to a language with embedded multimedia operations and the pattern configuration, the language providing visualization and modeling for the enterprise application integration system.

10. The computer program product in accordance with claim 9, wherein the multimedia requirements are classified according to a processing function to be applied to the media.

11. The computer program product in accordance with claim 9, wherein the semantic, application-level constructs include one or more constructs to extract an address and extract account data.

12. The computer program product in accordance with claim 9, wherein the classified requirements include operations to read, write, update, and query the media.

* * * * *